United States Patent
Weng et al.

(10) Patent No.: US 8,416,248 B2
(45) Date of Patent: Apr. 9, 2013

(54) METHODS AND DEVICE FOR DISPLAY DEVICE IN-SYSTEM PROGRAMMING THROUGH DISPLAYABLE SIGNALS

(75) Inventors: I-Hung Weng, Keelung (TW); Chih-Wei Cheng, Jhudong Town (TW)

(73) Assignee: STMicroelectronics Ltd., Tsim Sha Tsui Kowloon (HK)

( * ) Notice: Subject to any disclaimer, the term of this patent is extended or adjusted under 35 U.S.C. 154(b) by 817 days.

(21) Appl. No.: 12/495,695

(22) Filed: Jun. 30, 2009

(65) Prior Publication Data

US 2010/0245367 A1 Sep. 30, 2010

Related U.S. Application Data

(60) Provisional application No. 61/163,820, filed on Mar. 26, 2009.

(51) Int. Cl.
G06F 13/14 (2006.01)
G06F 9/44 (2006.01)
G06F 13/12 (2006.01)
G06F 17/00 (2006.01)
G06F 15/177 (2006.01)

(52) U.S. Cl.
USPC ........... 345/501; 345/522; 345/520; 345/546; 345/619; 717/100; 717/124; 717/168

(58) Field of Classification Search ............ 345/581, 345/619, 520, 522, 538, 546–548, 501; 700/17, 700/32; 717/100–105, 121, 124, 125–127, 717/131, 137, 168; 709/220–222; 710/62; 706/48

See application file for complete search history.

(56) References Cited

U.S. PATENT DOCUMENTS

| | | | |
|---|---|---|---|
| 5,664,163 A * | 9/1997 | Yutaka et al. | 345/522 |
| 2004/0156076 A1 * | 8/2004 | Togami et al. | 358/2.1 |
| 2004/0160445 A1 * | 8/2004 | Whatmough | 345/473 |
| 2006/0087936 A1 * | 4/2006 | Bart | 369/47.1 |
| 2007/0200859 A1 * | 8/2007 | Banks et al. | 345/520 |
| 2008/0231642 A1 * | 9/2008 | Okita | 345/629 |
| 2009/0150585 A1 * | 6/2009 | Haines | 710/106 |
| 2009/0153737 A1 * | 6/2009 | Glen | 348/571 |
| 2009/0300238 A1 * | 12/2009 | Panabaker et al. | 710/62 |
| 2010/0138509 A1 * | 6/2010 | Castaldi et al. | 709/206 |

* cited by examiner

*Primary Examiner* — Wesner Sajous
(74) *Attorney, Agent, or Firm* — Seed IP Law Group PLLC

(57) ABSTRACT

Methods and device for in-system firmware update in an information output device are provided. In one aspect, a method of firmware update in a display device receives a set of data in an image format through a video signal input channel of an input port of the display device. The set of data is converted from the image format to an instruction set format that is different from the image format. A first set of instructions that is used to operate the display device is updated with the set of data in the instruction set format.

20 Claims, 10 Drawing Sheets

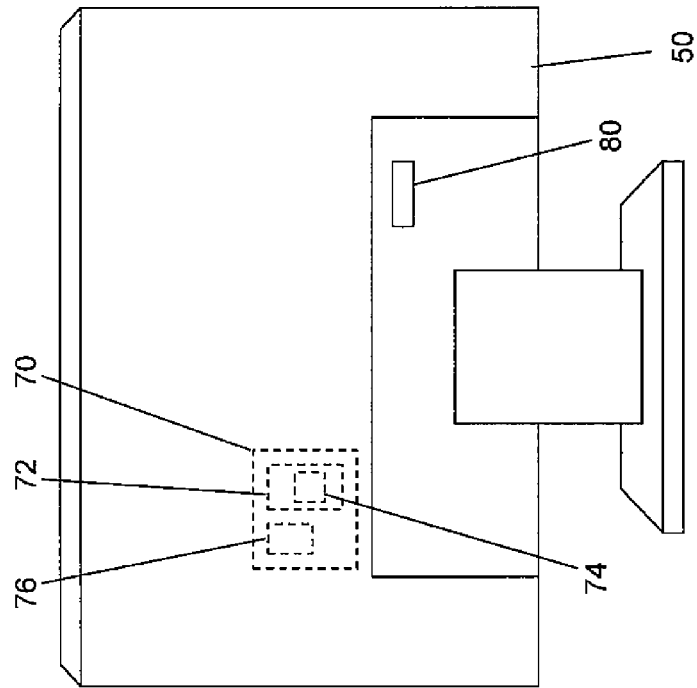
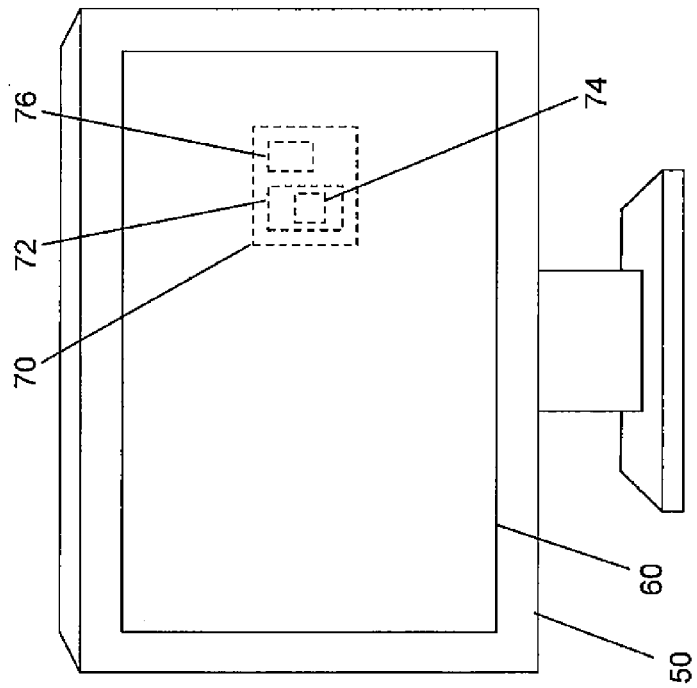
FIG. 3A
FIG. 3B
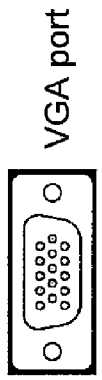 VGA port
 DVI port
 HDMI port
FIG. 3C

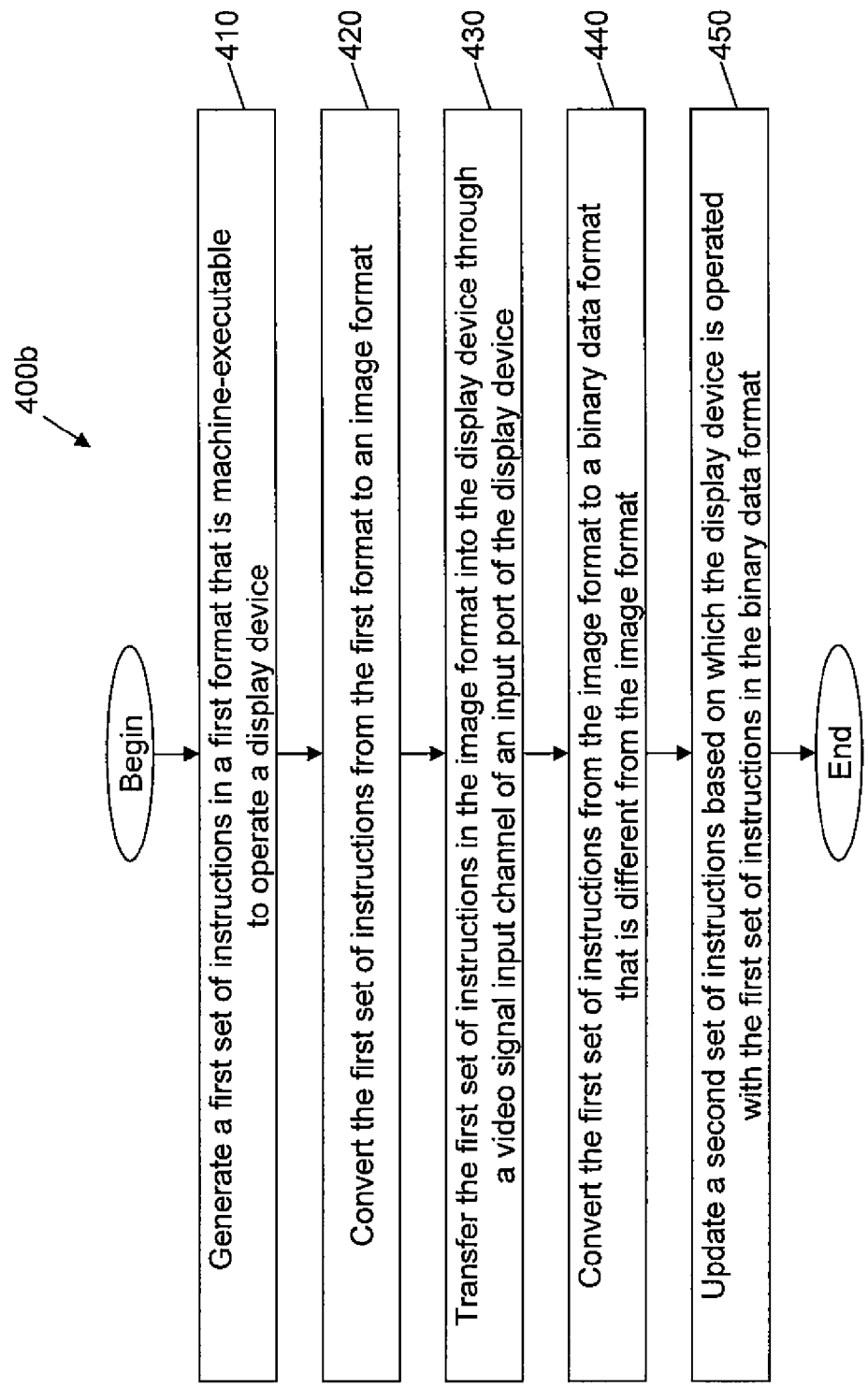

METHODS AND DEVICE FOR DISPLAY DEVICE IN-SYSTEM PROGRAMMING THROUGH DISPLAYABLE SIGNALS

CROSS-REFERENCE TO RELATED APPLICATION

This application claims the benefit under 35 U.S.C. §119 (e) of U.S. Provisional Patent Application Ser. No. 61/163,820, filed Mar. 26, 2009, entitled "Display Device In-System Programming Method Through Display Signals", which is incorporated herein by reference in its entirety.

BACKGROUND

1. Technical Field

This disclosure generally relates to the field of firmware update and, more particularly, to field firmware update for display devices.

2. Description of the Related Art

Firmware in general refers to a set of machine executable instructions stored in a device and used to control the basic operations of the device. Many of today's electronic devices and appliances—ranging from monitors, television sets, digital cameras and storage devices to washers—contain firmware. Firmware may be stored in read-only memory (ROM) in a device or, if some cases, stored in writable memory such as flash memory to allow for updates. Common reasons for updating firmware include fixing bugs or adding features to the device.

To update the firmware for a device, the device may need to be recalled and returned to a manufacturer for the update to be performed at the manufacturer's site. If the device is configured with a debug port, the manufacturer can use a proprietary hardware connector to transfer new firmware into the device through the debug port to update the existing firmware stored in the device. If the device does not have a debug port, an "open chassis" update may be required to access the internal memory in the device in order to update the existing firmware stored in the memory. In some cases, the storage medium where the firmware is stored in the device, such as a socketed ROM, must be replaced in order to update the firmware.

Often time there is not a debug port on a display devices such as a monitor, television set or the like that can be used for firmware update. The display device may be equipped with video/audio input ports, such as a video graphics array (VGA) port and/or a digital visual interface (DVI) port. At present time it is the display data channel (DDC) pin in the VGA or DVI port that is used to transfer new firmware into the display device for firmware update. As data transfer over the DDC pin is based on the Inter-integrated Circuit (I²C) protocol, the clock rate of which is usually less than 100 KHz, the time it takes to transfer a firmware file into the display device over the DDC pin is likely to be very long. Under such circumstances, a field firmware update by an end user may be a challenging, inconvenient or even unfeasible task. As a result, the end user is likely to suffer from the long wait time as the new firmware is slowly transferred into the display device via the DDC pin of the signal input port, or be required to send the device back to the manufacturer where the firmware update can be performed by, for example, one of the methods described above. This is not only inconvenient but also expensive to the end user.

BRIEF SUMMARY

In one aspect, a method of firmware update in a display device may be summarized as including: receiving a set of data in an image format through a video signal input channel of an input port of the display device; converting the set of data from the image format to an instruction set format that is different from the image format; and updating a first set of instructions that is used to operate the display device with the set of data in the instruction set format.

In another aspect, a method of firmware update in an information output device may be summarized as including: receiving a set of data in a first format through a video signal input channel of an input port of the information output device; converting the set of data from the first format to a second format that is different from the first format; and updating a first set of instructions that is used to operate the information output device with the set of data in the second format.

In yet another aspect, a method of providing firmware for firmware update in a display device may be summarizes as including: generating a first set of instructions in a first format that is machine-executable to operate the display device; converting the first set of instructions from the first format to an image format; and transferring the first set of instructions in the image format into the display device through a video signal input channel of an input port of the display device.

In still another aspect, a control circuit in an information output device may be summarized as including a memory and firmware update logic. The memory may be configured to store a first set of instructions, in a first format that is machine executable, based on which the information output device is operated. The firmware update logic may be configured to convert a set of data received through a video signal input channel of an input port of the information output device from a second format to the first format, the second format being different from the first format. The firmware update logic may further be configured to update the first set of instructions with the set of data in the first format.

BRIEF DESCRIPTION OF THE SEVERAL VIEWS OF THE DRAWINGS

FIG. 3A is a simplified diagram showing a front side of a display device having a control circuit according to one embodiment.

FIG. 3B is a simplified diagram showing a back side of the display device of FIG. 3A having a control circuit according to one embodiment.

FIG. 3C is a diagram showing a number of input ports one or more of which may be on the display device of FIG. 3A.

FIG. 7B is a flow chart of a process of providing firmware for firmware update in a display device according to another embodiment.

DETAILED DESCRIPTION

As used herein, the term "firmware" generally refers to a set of machine-executable instructions stored in a device and used to control the basic operations of the device.

Figure 1:
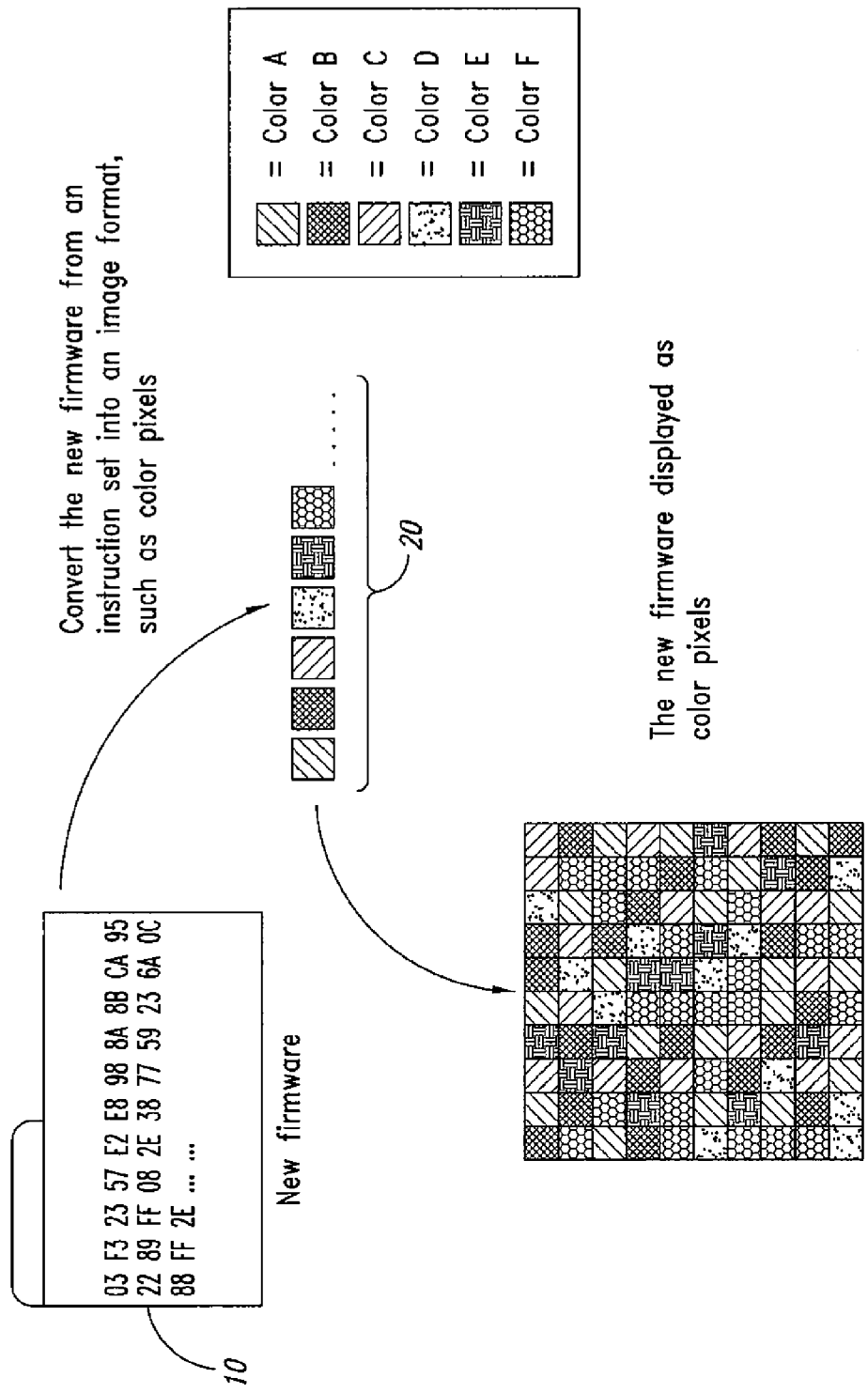
FIG. 1 is a diagram showing an inventive scheme of providing new firmware for firmware update in a display device according to one embodiment.

FIG. 1 illustrates an inventive scheme of providing new firmware for firmware update in a display device according to one embodiment.

Many display devices nowadays include a memory, such as flash memory for example, to store firmware that controls at least some basic operations of the display device. Under the inventive scheme illustrated in FIG. 1, when an instance of new firmware 10 is made available by the vendor of display devices, the vendor can enable end users of such display devices to perform a field firmware update of the existing firmware in the display device with the new firmware 10. As shown in FIG. 1, the new firmware 10 is first generated in a form of machine-executable format, such as the binary format. The binary format can be represented in the binary form, e.g., using the binary digits of 0 and 1, or in the hexadecimal form, e.g., using the hexadecimal digits of 0 through F, as shown in FIG. 1. The new firmware 10 is then converted to an image format.

In one embodiment, a conversion algorithm used for the conversion leverages the fact that each color shown on the display panel of a typical display device is a combination of the colors red, green and blue. As each of the color red, green and blue can be represented digitally by a byte, or eight bits, of data, the conversion algorithm converts every 24 bits of data in the new firmware 10 to a corresponding color. Accordingly, the result of the conversion is a set of data of colors 20 that can be displayed on the display panel as a plurality of color pixels.

Table 1 below shows a number of sample conversions from a 24-bit data to a corresponding color.

TABLE 1

Sample data to color conversion

| | First eight bits (representing the color red) | Second eight bits (representing the color green) | Third eight bits (representing the color blue) | Corresponding color |
|---|---|---|---|---|
| Example 1 | 00000000 | 00000000 | 00000000 | Black |
| Example 2 | 11111111 | 00000000 | 00000000 | Red |
| Example 3 | 00000000 | 11111111 | 00000000 | Green |
| Example 4 | 00000000 | 00000000 | 11111111 | Blue |
| Example 5 | 11111111 | 11111111 | 11111111 | White |
| Example 6 | 10000000 | 10000000 | 10000000 | Grey |

The new firmware 10, now in the image format, can be distributed to end users through one of many possible channels including, but not limited to, electronic mail, website download, postal delivery of a compact disc (CD) that stores the new firmware, etc.

Figure 2:
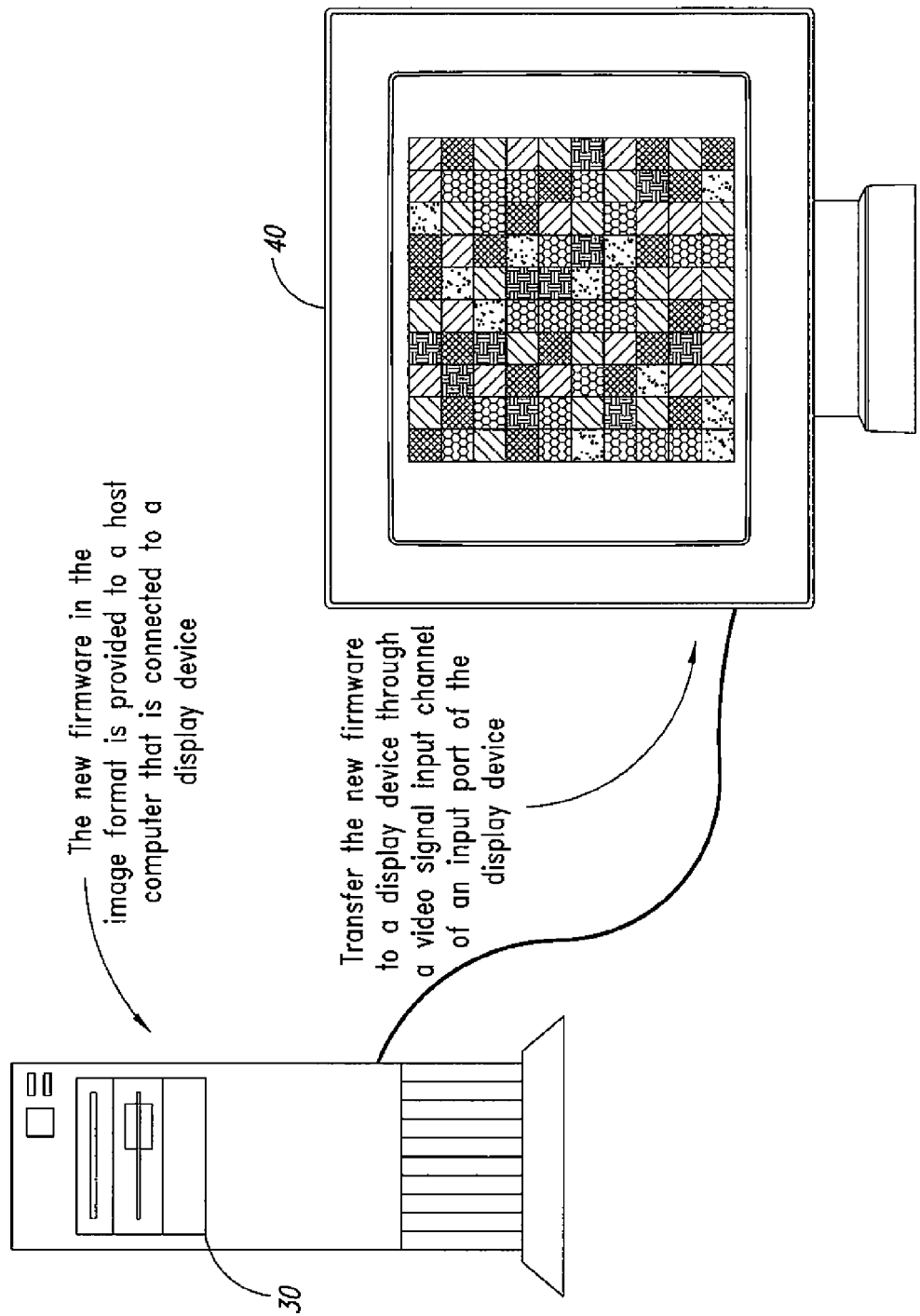
FIG. 2 is a diagram showing an inventive scheme of firmware update in a display device according to one embodiment.

FIG. 2 illustrates an inventive scheme of firmware update in a display device according to one embodiment.

As shown in FIG. 2, a display device 40, such as a computer monitor, is connected to a host computer 30. An end user receives a file containing the set of data 20 by electronic mail from the vendor of the monitor or downloading the set of data 20 from the vendor's website, for example, and the set of data 20 is at least temporarily stored in the host computer 30. Because the set of data 20 is in an image format, the set of data 20 can be transferred into the display device 40 as video signals at a high transfer rate over at least one of the Red Video pin, the Green Video pin, the Blue Video pin, the Horizontal Sync pin, and the Vertical Sync pin of the Video Graphics Array (VGA) port of the display device 40, for example. This allows very fast transfer of the new firmware 10 in the form of the set of data 20 from the host computer 30 to the display device 40. For illustration purpose, take a 16-color monitor with a 640×256 resolution and a 60 Hz scan rate for example. The amount of data transferred per second is 55.296 Mbytes (640×256×3×60=55.296 Mbytes). In comparison, the amount of data transferred per second over a DDC pin is 12.5 Kbytes (100,000/8=12.5 Kbytes).

The end user has the option of viewing the content of the set of data 20 on the screen or display panel of the display device 40 as a plurality of color pixels. A control circuit in the display device 40, such as the control circuit 70 of FIG. 7, converts the set of data 20 from the image format to the binary format and updates the existing firmware with the set of data 20. Accordingly, no "open chassis" firmware update is necessary and the new firmware 10, in the form of the set of data 20, can be transferred into the display device 40 at a much faster transfer rate compared to the 100 KHz rate over a DDC pin.

FIG. 3A illustrates a front side of a display device 50 having a control circuit 70 according to one embodiment. FIG. 3B illustrates a back side of the display device 50 having an input port 80. FIG. 3C illustrates a number of ports one or more of which may be the input port 80 of the display device 50.

The display device 50 includes the control circuit 70, the input port 80 and a display unit 60, such as a liquid crystal display (LCD) panel, plasma display panel, or another type of flat screen display panel, for example. The control circuit 70 includes a memory 72 and firmware update logic 76. The memory 72 is a device used to store data or programs, i.e., instructions. In one embodiment, the memory 72 is a programmable memory such as flash memory, for example. Firmware 74 is stored in the memory 72 and is used to control at least some basic operations of the display device 50. The firmware 74 is in a machine-executable, binary format.

In one embodiment, the control circuit 70 is a part of a graphics processor of the display device 50. Alternatively, the control circuit 70 is separate from the graphics processor of the display device 50. In one embodiment, the control circuit 70 is an integrated circuit chip.

In one embodiment, the firmware update logic 76 is configured to convert a set of data received through a video signal input channel of the input port 80 from a second format to the first format, where the second format being different from the first format. For example, the firmware update logic 76 converts the set of data 20 that is in an image format and received through a video signal input channel of the input port 80 to a binary format. In another embodiment, the firmware update logic 76 is further configured to update the firmware 74 with the set of data in the first format.

Understandably, firmware update does not typically take place often and it is not expected that every set of data received by a display device contains new firmware to allow the end user to perform a field firmware update. Thus, the firmware update logic 76 needs to be able to recognize that a received set of data contains new firmware when that is the case. In one embodiment, the firmware update logic 76 is configured to receive a user input indicative of firmware update using the set of data to convert the set of data from the second format to the first format and to update the existing firmware 74 with the set of data in the first format. For instance, a user of the display device 50 may select an "update firmware" option from among a number of options in an on-screen displayed menu. Upon receiving the selection of the "update firmware" option, the received set of data is converted into an instruction set format to update the existing firmware 74.

Alternatively, the firmware update logic 76 is configured to recognize a tell-tale pattern, or header, in the set of data, where the pattern indicates that the set of data contains a set of instructions for operating the display device to convert the set of data from the second format to the first format and to update the existing firmware 74 with the set of data in the first format.

Although FIG. 3B shows one input port 80 on the display device 50, there may be more than one input ports 80 in other embodiments. As shown in FIG. 3C, the input port 80 may be one of a VGA port, a Digital Visual Interface (DVI) port, or a High-Definition Multimedia Interface (HDMI) port. Regardless of the type, the input port 80 has a plurality of pins for data transfer. In particular, some of those pints of the input port 80 are used to transfer video signals at a faster transfer rate than for the transfer of non-video signals. For example, the Red Video pin, Green Video pin, Blue Video pin, Horizontal Sync pin, and Vertical Sync pin of the VGA port are typically used to transfer video signals. Similarly, the Transition Minimized Differential Signaling (TMDS) Data pins among the plurality of pins of a DVI port or an HDMI port are typically used to transfer video signals. In one embodiment, the set of data containing new firmware is transferred into the display device 50, and to the control circuit 70, over one or more of such video signal input pins to achieve high transfer rate.

Figure 4:
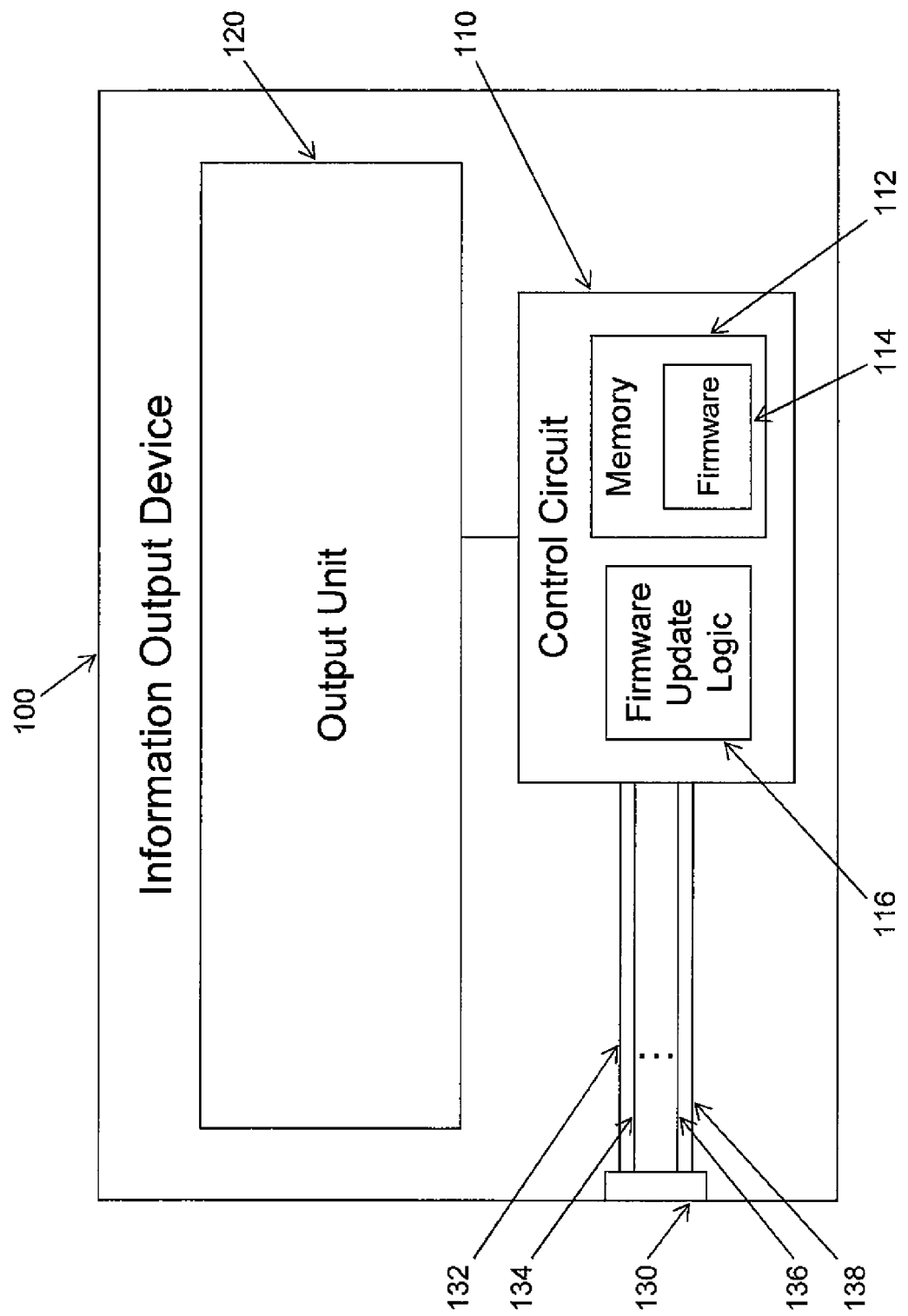
FIG. 4 is a simplified block diagram showing an information output device according to one embodiment.

FIG. 4 illustrates an information output device 100 according to one embodiment.

The information output device 100 may be a computer monitor, a television set, a multimedia device or the like that outputs visual information or audible information, or both. The information output device 100 includes a control circuit 110, an output unit 120 and an input port 130. The control circuit 110 is coupled to the output unit 120 o control at least some basic operations of the output unit 120. The control circuit 110 is also coupled to the input port 130 to receive input data from the input port 130 and process the received input data. The output unit 120 outputs visual information or visual/audible information. In one embodiment, the output unit 120 is a display unit that displays a plurality of pixels to represent visual information, such as texts, numbers and imagery, including still images and motion pictures. In another embodiment, the output unit 120 also includes a speaker that outputs sounds that represent music, speeches, and/or other audible information.

The input port 130 includes a plurality of signal input channels, such as pins, for example, for signal transfer. As shown in FIG. 4, the input port 130 includes signal input channels 132, 134, 136 and 138. Some of the signal input channels 132, 134, 136 and 138 are for the transfer of video signals while the remaining are for the transfer of non-video signals such as clock signals, auxiliary signals or data signals. For example, the signal input channels 132 and 134 may be video signal input pins while the signal input channels 136 and 138 may be non-video signal input pins. It will be understood that, although four signal input channels are shown in FIG. 4, the number of signal input channels may vary in various embodiments.

The input port 130 receives data-carrying signals that are transferred into the information output device 100 to be processed by the control circuit 110 and outputted by the output unit 120. When the information output device 100 includes a VGA port, a DVI port, or an HDMI port, the set of data is received through at least one of the video signal input channels 132 and 134, such as the Red Video pin, Green Video pin, Blue Video pin, Horizontal Sync pin, and Vertical Sync pin of the VGA port, or the TMDS Data pins of the DVI port or the HDMI port. Because the set of data is transferred through at least one of the video signal input channels 132 and 134 and that the bandwidth of video signal channel is large, the data is transferred at a high transfer rate.

In one embodiment, where the output unit 120 is a display unit, the signal input port 130 is a VGA port, a DVI port, an HDMI port, a Serial Digital Interface (SDI) port, a Unified Display Interface (UDI) port, a Universal Serial Bus (USB) port, a FireWire port, a DisplayPort port, or a Digital Component Video port. In any case, data carried in the signals received by the information output device 100 through the input port 130 is in a format that is in compliance with the particular standard that the input port 130 is based on, and the data is received at a high transfer rate. If the data carried in the signals is not in a proper format, such data may not be properly transferred through the input port 130 and received by the control circuit 110. In the case that the information output device 100 is a display device and that the output unit 120 is a display unit, such as an LCD panel, plasma display panel, or another type of flat screen display panel, for example, the received data is in an image format, e.g., color pixels, displayable on the output unit 120.

The control circuit 110 includes a memory 112 and firmware update logic 116. The memory 112 is a device used to store data or programs, i.e., instructions. In one embodiment, the memory 112 is a programmable memory such as a flash memory, for example. Firmware 114 is stored in the memory 112 and is used for at least some basic operations of the information output device 100. The firmware 114 is in a machine-executable, binary format.

In one embodiment, a user input from the end user is a command to the firmware update logic 116 to convert a received set of data from one format to another format, and to update the firmware 114 with the set of data after the format conversion. Upon receiving the user input, the firmware update logic 116 will perform the conversion and firmware update.

In another embodiment, the firmware update logic 116 recognizes, from a set of data carried in the signals received through the input port 130, whether the set of data contains a set of instructions, or new firmware, for updating the firmware 114. Once the firmware update logic 116 recognizes that an instance of new firmware is contained in the set of data received through the input port 130, the firmware update logic 116 proceeds to update the firmware 114 with the new firmware. To do so, the firmware update logic 116 first converts the received set of data from the format that is transferrable through the input port 130 to a format that the firmware 114 is in. After the received set of data has been converted to the format that the firmware 114 is in, the firmware update logic 116 updates the firmware 114 with the new firmware that is in the received set of data. In one embodiment, the firmware update logic 116 replaces the firmware 114 with the new firmware in updating the firmware 114. After the firmware 114 is updated, the firmware update logic 116 causes the control circuit 110 to operate at least some of the basic functions of the information output device 100 according to the updated firmware 114.

Figure 5:
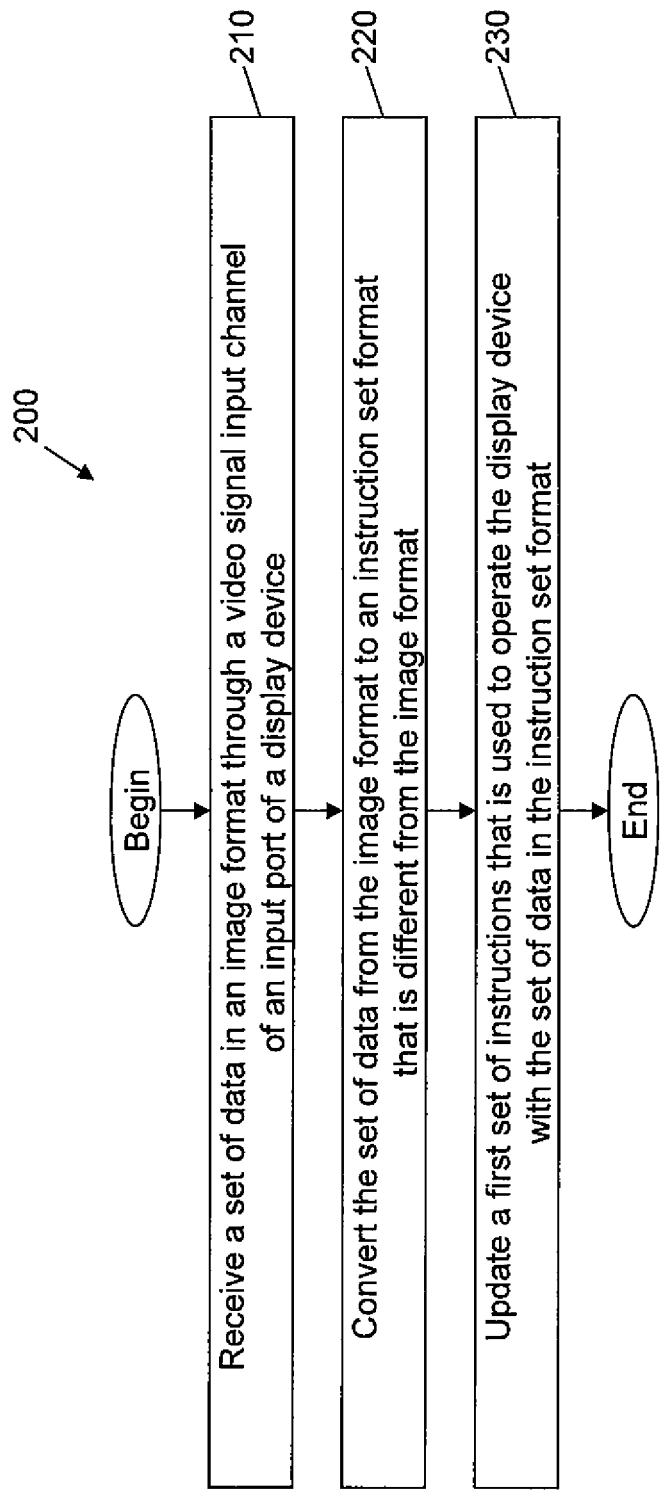
FIG. 5 is a flow chart of a process of firmware update in a display device according to one embodiment.

FIG. 5 illustrates a process 200 of firmware update in a display device according to one embodiment.

At 210, a set of data in an image format is received through a video signal input channel of an input port of the display device. At 220, the set of data is converted from the image format to an instruction set format that is different from the image format. At 230, a first set of instructions that is used to operate the display device is updated with the set of data in the instruction set format. Updating the first set of instructions with the set of data in the instruction format may include replacing the first set of instructions with the set of data in the instruction set format.

In one embodiment, the set of data in the image format is received through one or more of a Red Video pin, a Green Video pin, a Blue Video pin, a Horizontal Sync pin, and a Vertical Sync pin of a Video Graphics Array (VGA) port of the display device. In another embodiment, the set of data in the image format is received through one or more of a plurality of TMDS Data pins of a DVI port of the display device. In yet another embodiment, the set of data in the image format is received through one or more of a plurality of TMDS Data pins of an HDMI port of the display device.

In one embodiment, the conversion of the set of data from the image format to the instruction set format is not carried out unless a user input is received, where the user input is a command that firmware update is to be performed using the set of data. For instance, a user of a display device, such as a television set or a computer monitor, may select an "update firmware" option from among a number of options in an on-screen displayed menu. Upon receiving the selection of the "update firmware" option, the set of data received through one or more of the Red Video pin, the Green Video pin, the Blue Video pin, the Horizontal Sync pin, and the Vertical Sync pin of the VGA port of the display device is converted into the instruction set format. The existing set of instructions based on which the display device is operated is then updated with a new set of instructions contained in the set of data.

In another embodiment, the conversion of the set of data from the image format to the instruction set format is not carried out unless a tell-tale pattern, such as a header, contained in the set of data is identified as indicating that the set of data contains a new set of instructions for firmware update.

Figure 6A:
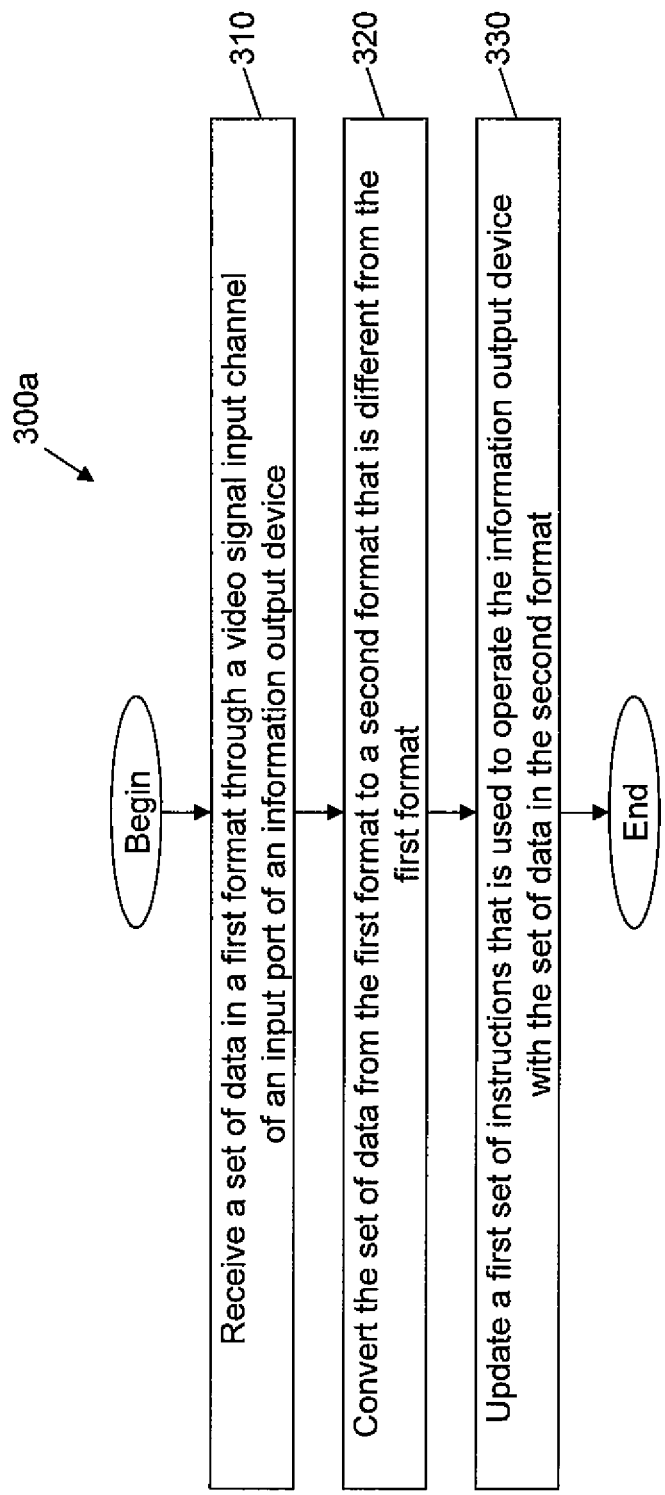
FIG. 6A is a flow chart of a process of firmware update in an information output device according to one embodiment.

FIG. 6A illustrates a process 300a of firmware update in an information output device according to one embodiment.

At 310, a set of data in a first format is received through a video signal input channel of an input port of an information output device. At 320, the set of data is converted from the first format to a second format that is different from the first format. At 330, a first set of instructions that is used to operate the information output device is updated with the set of data in the second format. In one embodiment, the set of data is in an image format and is received through one or more video signal pins of a VGA port, a DVI port, or a HDMI port of the information output device.

Figure 6B:
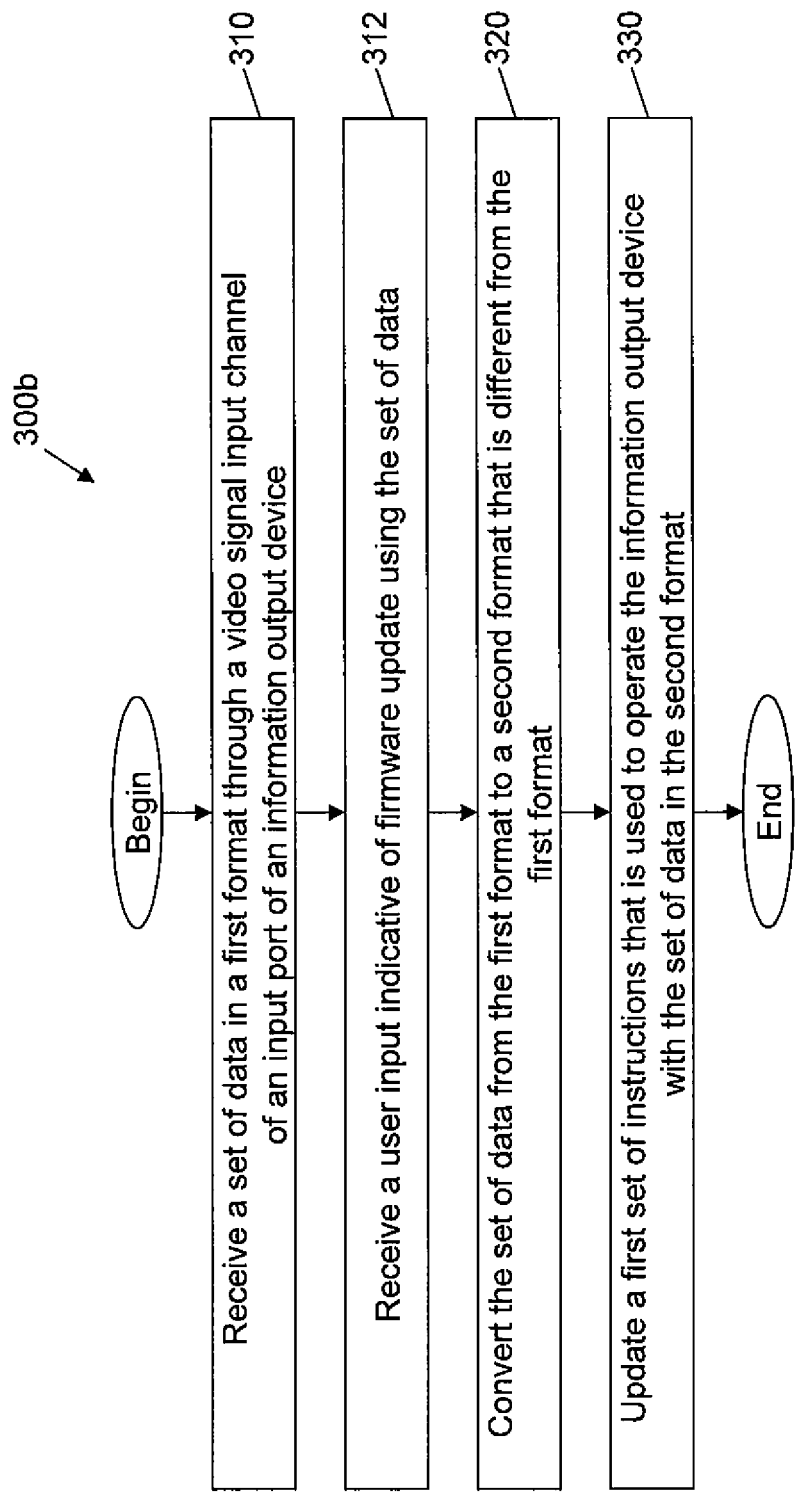
FIG. 6B is a flow chart of a process of firmware update in an information output device according to another embodiment.

FIG. 6B illustrates a process 300b of firmware update in an information output device according to another embodiment.

At 310, a set of data in a first format is received through a video signal input channel of an input port of an information output device. At 312, a user input is received, where the user input is indicative of firmware update using the set of data. At 320, the set of data is converted from the first format to a second format that is different from the first format. At 330, a first set of instructions that is used to operate the information output device is updated with the set of data in the second format. Accordingly, the conversion and updating will be triggered when the user input is received, where the user input is a command that firmware update is to be performed using the set of data.

Figure 6C:
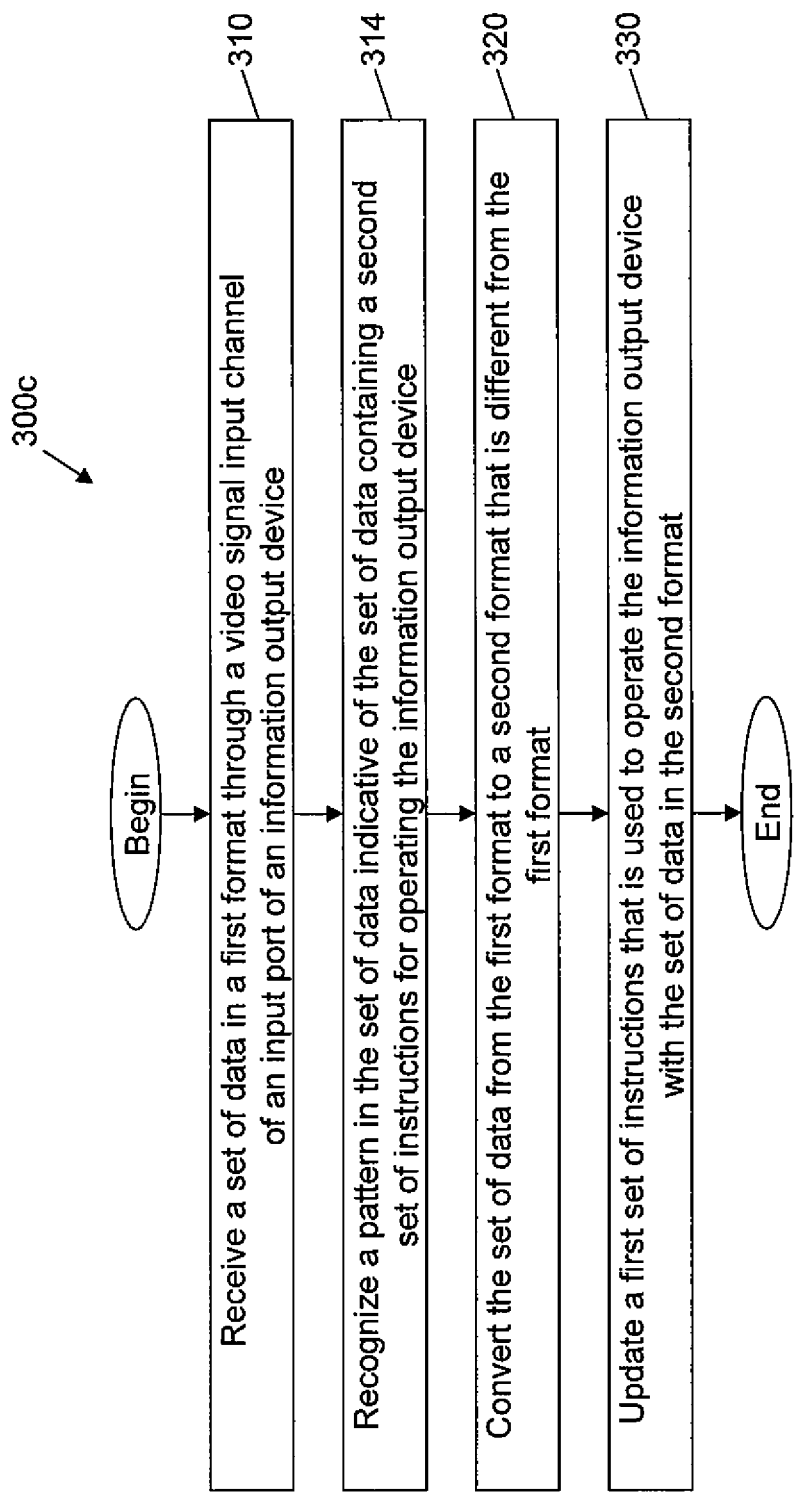
FIG. 6C is a flow chart of a process of firmware update in an information output device according to yet another embodiment.

FIG. 6C illustrates a process 300c of firmware update in an information output device according to yet another embodiment.

At 310, a set of data in a first format is received through a video signal input channel of an input port of an information output device. At 314, a pattern in the set of data is recognized as indicating that the set of data contains a second set of instructions for operating the information output device. At 320, the set of data is converted from the first format to a second format that is different from the first format. At 330, a first set of instructions that is used to operate the information output device is updated with the set of data in the second format. Accordingly, the conversion and updating will be triggered when the pattern in the set of data is recognized.

Figure 7A:
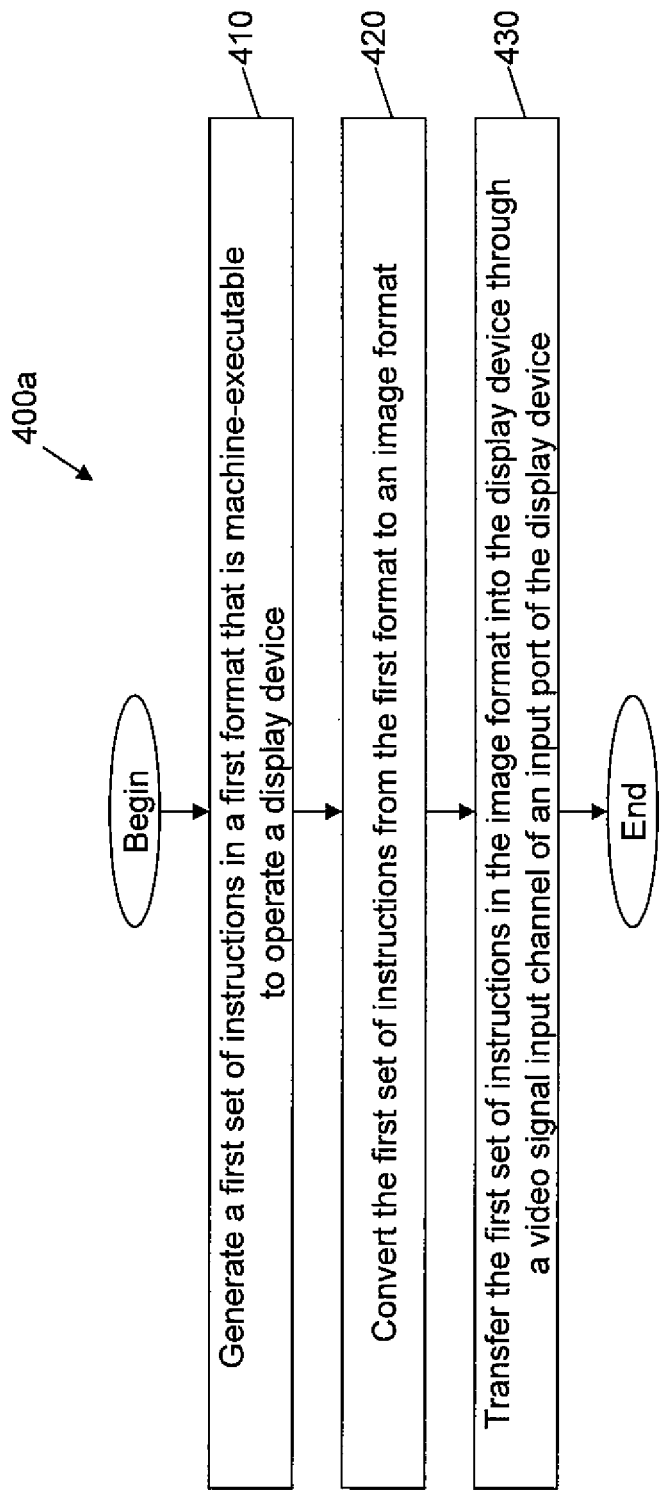
FIG. 7A is a flow chart of a process of providing firmware for firmware update in a display device according to one embodiment.

FIG. 7A illustrates a process 400a of providing firmware for firmware update in a display device according to one embodiment.

At 410, a first set of instructions in a first format that is machine-executable to operate a display device is generated. At 420, the first set of instructions is converted from the first format to an image format. At 430, the first set of instructions in the image format is transferred into the display device through a video signal input channel of an input port of the display device.

FIG. 7B illustrates a process 400b of providing firmware for firmware update in a display device according to another embodiment.

At 410, a first set of instructions in a first format that is machine-executable to operate a display device is generated. At 420, the first set of instructions is converted from the first format to an image format. At 430, the first set of instructions in the image format is transferred into the display device through a video signal input channel of an input port of the display device. At 440, the first set of instructions is converted from the image format to a binary format that is different from the image format. For example, the first set of instructions is converted from the image format to the first format, which is machine-executable to operate the display device. At 450, a second set of instructions based on which the display device is operated is updated with the first set of instructions in the binary format. Thus, after the second set of instructions is updated with the first set of instructions, the display device can be operated based on the updated second set of instructions.

Thus, embodiments of an inventive scheme to perform in-system firmware update have been disclosed. The implementation scheme according to the various embodiments disclosed herein advantageously resolve issues faced by vendors and end users with respect to firmware update. There is no need for a vendor to recall its products or for an end user to send the information output device back to the vendor for firmware update. There is no open-chassis update or socketed ROM replacement needed. With the proposed scheme, field firmware update can be achieved conveniently at low cost.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other context, not necessarily the exemplary context of firmware update in display devices generally described above. It will be understood by those skilled in the art that, although the embodiments described above and shown in the figures are generally directed to the context of firmware update in display devices, applications related to firmware update in data output devices other than display devices, for example, may also benefit from the concepts described herein.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of firmware update in a display device, the method comprising:
   receiving a set of data in an image format through a video signal input channel of an input port of the display device;
   converting the set of data from the image format to an instruction set format that is different from the image format; and
   updating a first set of instructions that is used to operate the display device with the converted set of data in the instruction set format.

2. The method of claim 1, wherein converting the set of data from the image format to an instruction set format comprises:
   receiving a user input indicative of a command to perform firmware update using the set of data; and
   converting the set of data from the image format to an instruction set format, the set of data including a set of instructions executable by a control circuit of the display device.

3. The method of claim 1, wherein converting the set of data from the image format to an instruction set format comprises:
   recognizing a pattern in the set of data indicative of the converted set of data containing a second set of instructions for operating the display device; and
   converting the set of data from the image format to the instruction set format.

4. The method of claim 1, wherein updating a first set of instructions that is used to operate the display device with the converted set of data in the instruction set format comprises replacing the first set of instructions that is used to operate the display device with the converted set of data in the instruction set format.

5. The method of claim 1, wherein receiving a set of data in an image format through a video signal input channel of an input port of the display device comprises receiving the set of data in the image format through one or more of a Red Video pin, a Green Video pin, a Blue Video pin, a Horizontal Sync pin, and a Vertical Sync pin of a Video Graphics Array (VGA) port of the display device.

6. The method of claim 1, wherein receiving a set of data in an image format through a video signal input channel of an input port of the display device comprises receiving the set of data in the image format through one or more of a plurality of Transition Minimized Differential Signaling (TMDS) Data pins of a Digital Visual Interface (DVI) port of the display device.

7. The method of claim 1, wherein receiving a set of data in an image format through a video signal input channel of an input port of the display device comprises receiving the set of data in the image format through one or more of a plurality of Transition Minimized Differential Signaling (TMDS) Data pins of a High-Definition Multimedia Interface (HDMI) port of the display device.

8. A method of firmware update in an information output device, the method comprising:
   receiving a set of data in a first format through a video signal input channel of an input port of the information output device;
   converting the set of data from the first format to a second format that is different from the first format; and
   updating a first set of instructions that is used to operate the information output device with the converted set of data in the second format.

9. The method of claim 8, wherein receiving a set of data in a first format through a video signal input channel of an input port of the information output device comprises receiving the set of data in an image format through one or more video signal pins of a Video Graphics Array (VGA) port, a Digital Visual Interface (DVI) port, or a High-Definition Multimedia Interface (HDMI) port of the information output device.

10. The method of claim 8 further comprising:
    receiving a user input indicative of a command to perform firmware update using the set of data before converting the set of data from the first format to the second format and updating the first set of instructions that is used to operate the information output device with the converted set of data in the second format.

11. The method of claim 8 further comprising:
    recognizing a pattern in the set of data indicative of the converted set of data containing a second set of instructions for operating the information output device before converting the set of data from the first format to the second format and updating the first set of instructions that is used to operate the information output device with the converted set of data in the second format.

12. A method of providing firmware for firmware update in a display device, comprising:
    generating a first set of instructions in a first format that is machine-executable to operate the display device;
    converting the first set of instructions from the first format to an image format; and
    transferring the first set of instructions in the image format into the display device through a video signal input channel of an input port of the display device.

13. The method of claim 12 further comprising:
    converting the first set of instructions from the image format to a binary format that is different from the image format; and
    updating a second set of instructions based on which the display device is operated with the converted first set of instructions in the binary format.

14. A control circuit in an information output device, comprising:
    a memory configured to store a first set of instructions, in a first format that is machine executable, based on which the information output device is operated; and
    firmware update logic configured to convert a set of data received through a video signal input channel of an input port of the information output device from a second format to the first format, the second format being different from the first format, the firmware update logic further configured to update the first set of instructions with the converted set of data in the first format.

15. The control circuit of claim 14, wherein the firmware update logic is configured to receive a user input indicative of firmware update using the set of data to convert the set of data from the second format to the first format and to update the first set of instructions with the converted set of data in the first format.

16. The control circuit of claim 14, wherein the firmware update logic is configured to recognize a pattern in the set of data indicative of the set of data containing a second set of instructions for operating the display device to convert the set of data from the second format to the first format and to update the first set of instructions with the converted set of data in the first format.

17. The control circuit of claim 14, wherein the information output device comprises a display device, and wherein the firmware update logic is configured to convert the set of data from an image format that is displayable by the display device to a binary format.

18. The control circuit of claim 14, wherein the set of data is received through one or more of a Red Video pin, a Green Video pin, a Blue Video pin, a Horizontal Sync pin, and a Vertical Sync pin of a Video Graphics Array (VGA) port of the display device.

19. The control circuit of claim 14, wherein the set of data is received through one or more of a plurality of Transition Minimized Differential Signaling (TMDS) Data pins of a Digital Visual Interface (DVI) port of the display device.

20. The control circuit of claim 14, wherein the set of data is received through one or more of a plurality of Transition Minimized Differential Signaling (TMDS) Data pins of a High-Definition Multimedia Interface (HDMI) port of the display device.

* * * * *